United States Patent Office 3,458,265
Patented July 29, 1969

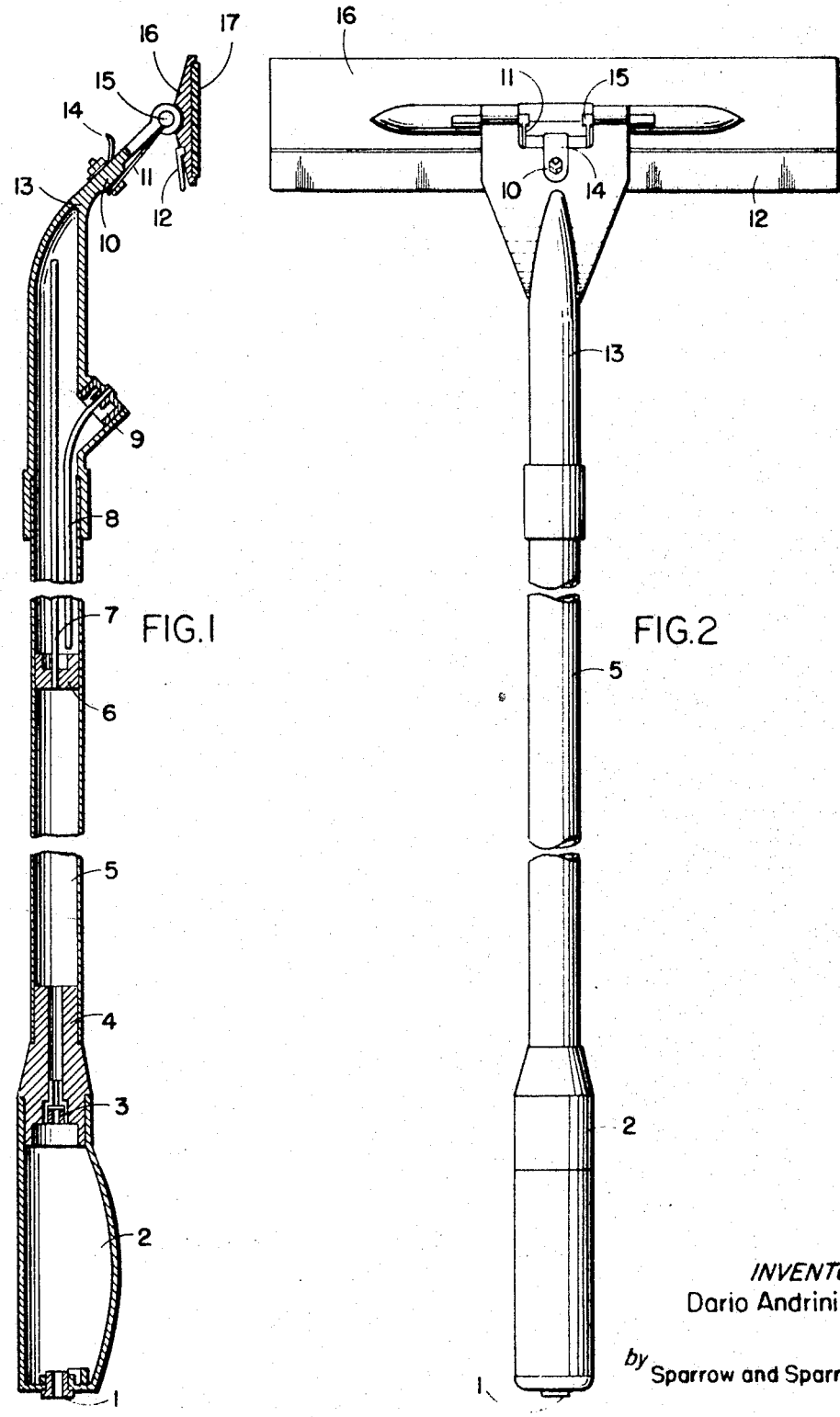

---

3,458,265
IMPLEMENT FOR CLEANING GLASS SHEETS, WASHABLE WALLS AND THE LIKE, PROVIDED WITH STORAGE TANK AND MANUALLY OPERABLE PUMPING DEVICE FOR EJECTING A SPRAY OF DETERGENT LIQUID
Dario Andrini, Dormelletto, Italy, assignor to Michele Agrimi, Genoa, Italy
Filed Mar. 6, 1967, Ser. No. 620,786
Int. Cl. A47l *13/00, 13/03*
U.S. Cl. 401—139      4 Claims

ABSTRACT OF THE DISCLOSURE

An apparatus for cleaning windows, walls and the like having a tubular rod, the handle of which is formed by a hand-pumping device capable of pumping liquid, held in a storage tank in the upper portion of the rod, through an atomizing nozzle, located on the upper portion of the rod, on to the surface to be cleaned. A sponge, to wash, and a wiper, to dry, are located at the top of the rod above the nozzle.

BACKGROUND OF THE INVENTION

The implement of the invention has been devised to increase the ease and the safety in cleaning glass-sheets and panes in general, and particularly the larger ones that are used in modern buildings. Some types of implements for similar cleaning purposes are known, that are formed by a rod or stick that is provided at its top end with a cross member carrying a sponge and a rubber strip, so as to enable the use of one side thereof for washing and of the other side thereof for wiping dry the surface of the glass. This system, however, is unconformable because during the washing it is impossible to obtain an appropriate distribution of the liquid on the glass-surface; and to achieve such distribution it is often necessary to interrupt the operation and sprinkle the liquid from the container onto the glass.

SUMMARY OF THE INVENTION

The implement according to the invention is characterised by a tubular rod or stick, made of metal or any other suitable material, the handle of which is formed by a knob-like pumping device with resilient material provided of two suction and discharge valves, capable of generating a pneumatic pressure in the storage tank of the implement, which is contained in the upper portion of said tubular rod. The implement is further characterised also by a spray atomizing nozzle and by a fork-like portion for connection to the cleaning slide or brush for cleaning the desired surfaces, said portion being hermetically mounted on the free end of the tubular rod, and said slide or brush—having on one side a layer of sponge plastic cemented thereto and adapted to effect the washing and on the opposite side a rubber strip for wiping dry the surface of the glass—is thoroughly independent, is disposed immediately above the atomizing nozzle, is freely rotatable back and forth, and can be quickly disconnected by slightly squeezing between two fingers a spring member that connects it to the implement. The arrangement is such that when, by a reciprocating motion of the hand, the pumping device is actuated, the simultaneous and opposed action of said suction and discharge valves in the resilient handle compresses the air above the level of the liquid in said tank and generates a pressure that ejects an atomized spray of said liquid through a plunging tube and the atomizing nozzle.

BRIEF DESCRIPTION OF THE DRAWINGS

A preferred embodiment of the invention is shown, by way of nonlimitating example, in the enclosed drawing, wherein:

FIG. 1 is an axial side sectional elevation of the implement according to the invention;

FIG. 2 is a front view thereof.

DESCRIPTION OF THE PREFERRED EMBODIMENT

With reference to the drawing, the implement according to the invention comprises a rod or stick 5 formed of a pipe of metal or any other suitable material, provided at the lower end thereof with a connection member 4 having at the lower end thereof a recess wherein a resilient handle 2, suitably sized and shaped to be squeezed by a hand, can be snugly fitted. The connection member 4 has an axial bore containing a pneumatic valve 3; a second pneumatic valve 1 is disposed in an axial bore that is formed in the lower end wall of the resilient handle 2. The operation of these valves will be described hereinafter.

Hermetically mounted on the top end of the rod or stick 5 is a closure member 13 formed by a blind tubular member having a tapering top portion and an end fork-like member that is slightly inclined with respect to the central axis of the implement, whereon is pivotably connected by means of removable pins 15 a cleaning slide or brush 16 that is formed by a plate of metal or any other suitable material and the free face of which has cemented thereto a layer of sponge plastic 17. A rubber strip 12 is fixed on the opposite side adjacent one of the edges of said plate. In order to achieve ready disassembling and re-assembling of the slide or brush 16, the removable pins 15 are connected to the ends of a U-shaped spring 11 that is held in place by a screw 10 and that can be removed by slightly squeezing it between two fingers. The screw 10 also fixes in place a locking member 14, made of sheet steel, capable of locking the slide or brush 16 in an overturned position when the side thereof that is provided with the rubber strip 12 is to be used.

The closure member 13 is also centrally provided with a hole and tubular projection, slightly inclined with respect to the central axis of the implement, wherein is engaged a plug 9 having a little axial hole, acting as an atomizer, connected with a flexible plunging tube 8 that extends to the bottom end of the tank.

Tightly fitted in the tubular rod 5, at a predetermined point, is a plug 6 having a hole therethrough and a pipe 7, that defines the length of the tank. Said pipe 7 extends along the whole length of the tank and terminates, within the tank, immediately above the atomizing nozzle 9. This nozzle 9 and its tube 8 will be removed when the tank is to be filled.

The implement operates as follows:

By manually squeezing the resilient handle 2, the increasing pressure in the internal chamber thereof closes valve 1 so that air opens valve 3 and is forced into the rod 5. When said squeezing of the handle ceases, the latter returns into the original shape and by so doing creates a vacuum tending to close valve 3 and open valve 1 to draw air therein. Therefore, by repeatedly squeezing and releasing the resilient handle 2, air is drawn through valve 1, fills the internal chamber of said handle, and is forcedly discharged therefrom, through valve 3, and enters the rod or stick 5 wherefrom, through said perforated plug 6 and pipe 7, reaches the upper portion of the tank. A few such movements of the handle create a considerable air pressure within the rod or stick, and the compressed air presses the liquid in the tank and forces it through the tube 8 and atomizer 9 from which it is ejected with force and with a wide atomized spray in front of the implement.

I claim:
1. An implement for cleaning glass-sheets, washable walls and the like, provided with storage tank and manually operable pumping device for ejecting a spray of detergent liquid, comprising a long tubular rod, a handle on said rod, said handle forming a knob-like chamber of resilient material constituting manual pumping means adapted to generate within said rod a pneumatic pressure capable of ejecting a spray of detergent liquid, said storage tank being incorporated in the opposite end portion of said rod by snugly fitting therein a perforated plug provided with an axial pipe through which the compressed air passes above the level of the liquid to distribute, a closure member, a plug having an atomizer hole and a plunging tube and fixed on one side of said closure member, said pipe extending substantially through the whole length of said tank and terminating within the tank above the level of said plug, cleaning means connected to said closure member, said closure member being tightly fitted on the free end of said tubular rod, the arrangement being such that when the pumping handle is actuated by reciprocating movement of a hand, air is compressed above the level of the liquid in the tank and expels said liquid through said plunging tube and atomizer plug.

2. An implement according to claim 1, wherein said handle is mounted on a connecting member tightly fitted in said rod and is provided with an air valve on the connection side in the hole therethrough, which valve opens and permits passage of air when said handle is squeezed and closes when said handle is released to return into its original shape, said handle being also provided with a second air valve mounted in a hole in the end portion of the free end of the handle, which valve closes when the handle is squeezed and opens when the same is released thus effecting the filling of said chamber of the handle, the simultaneous actuation of said valves providing the cycle of suction and compression of air in the tank of the implement.

3. An implement according to claim 2, wherein said closure member fitted on the free end of said tubular rod is formed by a length of blind pipe having a tapering upper portion and having a centrally located side hole with a slightly inclined tubular projection wherein said atomizer plug is tightly fitted, said closure member having a fork-like member for pivotable connection, by means of removable pins connected to a spring member, to said cleaning means, said cleaning means being formed by a plate member with lugs for connection to said fork-like member, said plate member having connected to its free face a layer of spongy material, and having a rubbery strip fixed on the opposite side thereof adjacent one of the edges of said plate member, the arrangement being such as to render said cleaning means completely independent and freely rotatable during the use of the portion thereof having the spongy layer, or locked in an overturned position during the use of the portion thereof having said rubbery strip, and quickly disconnectable by slightly squeezing between two fingers the spring member that effects connection by means of said removable pins.

4. An implement according to claim 1 wherein said closure member fitted on the free end of the tubular rod is formed by a length of blind pipe having a tapering upper portion and having a centrally located side hole with a slightly inclined tubular projection wherein the atomizer plug is tightly fitted, said closure member having a fork-like member for pivotable connection, by means of removable pins connected to a spring member, to said cleaning means, said cleaning means being formed by a plate member with lugs for connection to said fork-like member, said plate member having connected to its free face a layer of spongy material, and having a rubbery strip fixed on the opposite side thereof adjacent one of the edges of the plate member, the arrangement being such as to render said cleaning means completely independent and freely rotatable during the use of the portion thereof having the spongy layer, or locked in an overturned position during the use of the portion thereof having said rubbery strip, and quickly disconnectable by slightly squeezing between two fingers the spring member that effects connection by means of said removable pins.

References Cited

UNITED STATES PATENTS

| | | | |
|---|---|---|---|
| 419,871 | 1/1890 | Orcutt | 15—546 |
| 1,903,896 | 4/1933 | Greenberg | 15—546 |
| 2,047,199 | 7/1936 | Gewalt | 15—546 |
| 2,104,161 | 1/1938 | Koukal | 15—553 XR |
| 3,304,573 | 2/1967 | Stefely | 15—553 |

BILLY J. WILHITE, Primary Examiner

ROBERT I. SMITH, Assistant Examiner

U.S. Cl. X.R.

401—188